United States Patent
Boden

(10) Patent No.: US 8,021,784 B2
(45) Date of Patent: Sep. 20, 2011

(54) CURELESS BATTERY PASTE AND METHOD FOR PRODUCING BATTERY PLATES

(75) Inventor: David Paul Boden, Charlottesville, VA (US)

(73) Assignee: Hammond Group, Inc., Hammond, IN (US)

( * ) Notice: Subject to any disclaimer, the term of this patent is extended or adjusted under 35 U.S.C. 154(b) by 1440 days.

(21) Appl. No.: 11/444,987

(22) Filed: Jun. 1, 2006

(65) Prior Publication Data

US 2006/0216599 A1    Sep. 28, 2006

Related U.S. Application Data

(63) Continuation-in-part of application No. 10/806,922, filed on Mar. 23, 2004, now Pat. No. 7,118,830.

(51) Int. Cl.
*H01M 4/56* (2006.01)

(52) U.S. Cl. .......................... 429/227; 429/228

(58) Field of Classification Search .................. None
See application file for complete search history.

(56) References Cited

U.S. PATENT DOCUMENTS

| | | |
|---|---|---|
| 3,765,943 A | 10/1973 | Biagetti |
| 3,881,954 A | 5/1975 | Maskalick |
| 3,973,991 A | 8/1976 | Cestaro et al. |
| 4,331,516 A | 5/1982 | Meighan |
| 4,336,236 A | 6/1982 | Kolakowski et al. |
| 4,338,163 A | 7/1982 | Rittenhouse |
| 4,381,250 A | 4/1983 | Rittenhouse |
| 4,401,730 A | 8/1983 | Szymborski et al. |
| 4,415,410 A | 11/1983 | Reich |
| 4,507,372 A | 3/1985 | Rowlette |
| 4,713,304 A | 12/1987 | Rao et al. |
| 4,735,870 A | 4/1988 | Rowlette |
| 4,758,372 A | 7/1988 | Eirich et al. |
| 4,889,778 A | 12/1989 | Misra et al. |
| 4,982,482 A | 1/1991 | Wheadon et al. |
| 4,986,317 A | 1/1991 | Takahashi et al. |
| 4,996,340 A | 2/1991 | Miller |
| 5,017,446 A | 5/1991 | Reichman et al. |
| 5,044,067 A | 9/1991 | Wheadon et al. |
| 5,045,170 A | 9/1991 | Bullock et al. |
| 5,079,111 A | 1/1992 | Wheadon et al. |
| 5,096,611 A | 3/1992 | Matthew et al. |
| 5,149,606 A | 9/1992 | Bullock et al. |
| 5,252,105 A | 10/1993 | Witherspoon et al. |
| 5,273,554 A | 12/1993 | Vyas |
| 5,276,960 A | 1/1994 | Wheadon et al. |
| 5,290,359 A | 3/1994 | Coonen et al. |
| 5,302,476 A | 4/1994 | Kao et al. |
| 5,314,766 A | 5/1994 | Witherspoon et al. |
| 5,384,217 A | 1/1995 | Binder et al. |
| 5,434,025 A | 7/1995 | Rao et al. |

(Continued)

OTHER PUBLICATIONS

PCT International Preliminary Report on Patentability and Written Opinion of the International Searching Authority for PCT App. No. PCT/US2007/012781 dated Dec. 18, 2008.

*Primary Examiner* — Jonathan Crepeau

(74) *Attorney, Agent, or Firm* — Patula & Associates, P.C.

(57) ABSTRACT

A battery paste composition incorporates and promotes the formation of tetra basic lead sulfate using a micronized TTBLS additive, and eliminates free lead using a special oxide, during paste mixing and drying. Battery plates utilizing the disclosed battery paste composition are produced without the need for curing, and instead can be used in the battery immediately following plate drying.

23 Claims, 16 Drawing Sheets

| Type of Lead-Acid Battery Paste Mix | Lead Oxide | Micronized TTBLS Additive | Water | Sulfuric Acid | Flock |
|---|---|---|---|---|---|
| Control | 45.4 kg (81.86 % weight) | 0.0 kg (0.0 % weight) | 5 kg (9.02 % weight) | 5.04 kg (9.09 % weight) | 0.02 kg (0.04 % weight) |
| Standard Lead Oxide | 45.4 kg (81.2 % weight) | 0.45 kg (0.8 % weight) | 5 kg (8.94 % weight) | 5.04 kg (9.01 % weight) | 0.02 kg (0.04 % weight) |
| Lead Oxide w/ Low Free Lead (15%) | 45.4 kg (81.2 % weight) | 0.45 kg (0.8 % weight) | 5 kg (8.94 % weight) | 5.04 kg (9.01 % weight) | 0.02 kg (0.04 % weight) |
| Lead Oxide w/ Free Lead of 0.3% | 45.4 kg (80.2 % weight) | 0.45 kg (0.79 % weight) | 5.7 kg (10.07 % weight) | 5.04 kg (8.90 % weight) | 0.02 kg (0.04 % weight) |

U.S. PATENT DOCUMENTS

| | | | |
|---|---|---|---|
| 5,460,730 | A | 10/1995 | Czerny et al. |
| 5,540,127 | A | 7/1996 | Binder et al. |
| 5,601,945 | A | 2/1997 | Clough |
| 5,652,074 | A | 7/1997 | Larson, III et al. |
| 5,660,600 | A | 8/1997 | Vyas |
| 5,690,718 | A | 11/1997 | Sabin |
| 5,691,087 | A | 11/1997 | Rao et al. |
| 5,759,716 | A | 6/1998 | Clough |
| 5,874,186 | A | 2/1999 | Rao et al. |
| 5,895,732 | A | 4/1999 | Clough |
| 5,945,236 | A | 8/1999 | Willis |
| 5,948,566 | A | 9/1999 | Larsen et al. |
| 5,948,567 | A | 9/1999 | Heller |
| RE36,734 | E | 6/2000 | Binder et al. |
| 6,117,196 | A | 9/2000 | Snyder et al. |
| 6,180,286 | B1 | 1/2001 | Rao et al. |
| 6,228,527 | B1 | 5/2001 | Medeiros et al. |
| 6,395,431 | B1 | 5/2002 | Gao et al. |
| 6,454,977 | B1 | 9/2002 | Kwok et al. |
| 6,528,211 | B1 | 3/2003 | Nishimura et al. |
| 6,531,248 | B1 | 3/2003 | Zguris et al. |
| 6,555,026 | B1 | 4/2003 | Barker et al. |
| 6,617,071 | B2 | 9/2003 | Chen et al. |
| 6,623,892 | B1 | 9/2003 | Yamaguchi et al. |
| 6,632,573 | B1 | 10/2003 | Nimon et al. |
| 6,635,192 | B1 | 10/2003 | Schwarz |
| 6,635,387 | B2 | 10/2003 | Fitter et al. |
| 6,733,547 | B2 | 5/2004 | Ma |
| 6,749,950 | B2 | 6/2004 | Zhang |
| 6,755,874 | B2 | 6/2004 | Chen et al. |
| 2002/0124388 | A1 | 9/2002 | Chen et al. |
| 2003/0044683 | A1 | 3/2003 | Zguris et al. |
| 2003/0106205 | A1 | 6/2003 | Ma |
| 2003/0157405 | A1 | 8/2003 | Chen et al. |
| 2003/0165742 | A1 | 9/2003 | Mann |
| 2003/0175203 | A1 | 9/2003 | Nitsche et al. |
| 2004/0121233 | A1 | 6/2004 | Klein et al. |
| 2004/0234852 | A1 | 11/2004 | Klein et al. |
| 2005/0048372 | A1 | 3/2005 | Chen et al. |
| 2005/0207969 | A1 | 9/2005 | Flores-Lira et al. |

Typical Properties of Lead-Acid Battery Leady Oxides

| Battery Leady Oxide Properties | Automotive Batteries | Industrial Batteries |
|---|---|---|
| PbO | 73-81% | 69-77% |
| Free lead | 19-27% | 21-31% |
| Apparent density | 1.1-1.47 g./cu. cm. | 1.40-1.77 g./cu. cm. |
| Acid absorption | 175 mg./g. minimum | 130-155 mg./g. |
| Median particle size | 2.2 µm | 2.8 µm |

FIGURE 1B
(Prior Art)

Examples of Lead Oxides Useful for Production of Cureless Pastes

| Properties | Conventional Leady oxide | Low free lead leady oxide | Calcined lead monoxide | Flash calcined lead monoxide |
|---|---|---|---|---|
| Pb | 25% | 15% | 0.15% | 0.15% |
| Tetragonal PbO | 70% | 70% | -- | -- |
| Orthorhombic PbO | 5% | 15% | 99.85% | 99.85% |
| Apparent density | 1.3g/cu. cm. | 1.7g/cu. cm. | 1.7g/cu. cm. | 1.7g/cu. cm. |
| Acid absorption | 175 mg./g. | -- | -- | -- |
| Median particle size | 2.2 µm | 4.5 µm | 4.5 µm | 4.5 µm |

FIGURE 2

| Type of Lead-Acid Battery Plate Paste Mix | Lead Oxide | Micronized TTBLS Additive | Water | Sulfuric Acid | Flock | Expander |
|---|---|---|---|---|---|---|
| Automotive Positive Plate Paste | 1071 kg (79.52%weight) | 10.71 kg (0.79%weight) | 140 kg (10.39%weight) | 125 kg (9.28%weight) | 0.5 kg (0.02%weight) | 0 |
| Automotive Battery Negative Paste | 1071 kg (78.30%weight) | 10.71 kg (0.79%weight) | 140 kg (10.23%weight) | 135 kg (9.86%weight) | 0.5 kg (0.03%weight) | 10.71 kg (0.79%weight) |
| Industrial Positive Plate Paste | 1071 kg (80.09%weight) | 10.71 kg (0.80%weight) | 135 kg (79.52%weight) | 120 kg (8.98%weight) | 0.5 kg (0.04%weight) | 0 |
| Industrial Battery Negative Paste | 1071 kg (79.41%weight) | 10.71 kg (0.79%weight) | 130 kg (9.64%weight) | 115 kg (8.53%weight) | 0.5 kg (0.04%weight) | 21.4 kg (1.59%weight) |

FIGURE 3A

| Type of Lead-Acid Battery Paste Mix | Lead Oxide | Micronized TTBLS Additive | Water | Sulfuric Acid | Flock |
|---|---|---|---|---|---|
| Control | 45.4 kg (81.86 % weight) | 0.0 kg (0.0 % weight) | 5 kg (9.02 % weight) | 5.04 kg (9.09 % weight) | 0.02 kg (0.04 % weight) |
| Standard Lead Oxide | 45.4 kg (81.2 % weight) | 0.45 kg (0.8 % weight) | 5 kg (8.94 % weight) | 5.04 kg (9.01 % weight) | 0.02 kg (0.04 % weight) |
| Lead Oxide w/ Low Free Lead (15%) | 45.4 kg (81.2 % weight) | 0.45 kg (0.8 % weight) | 5 kg (8.94 % weight) | 5.04 kg (9.01 % weight) | 0.02 kg (0.04 % weight) |
| Lead Oxide w/ Free Lead of 0.3% | 45.4 kg (80.2 % weight) | 0.45 kg (0.79 % weight) | 5.7 kg (10.07 % weight) | 5.04 kg (8.90 % weight) | 0.02 kg (0.04 % weight) |

FIGURE 3B

Example 2

Positive plates produced from leady oxide with 15% free lead and 1% micronized tetrabasic lead sulfate. Tetrabasic lead sulfate, free lead and moisture contents of lead-acid battery positive plates during drying.

CURELESS BATTERY PASTE AND METHOD FOR PRODUCING BATTERY PLATES

CROSS-REFERENCE TO RELATED U.S. APPLICATION

The present application is a continuation-in-part part application of U.S. patent application Ser. No. 10/806,922, filed Mar. 23, 2004, now U.S. Pat. No. 7,118,830, entitled "Battery Paste Additive and Method for Producing Battery Plates," the entire specification and disclosure of which is herein incorporated by reference.

FIELD OF INVENTION

The present disclosure relates generally to battery pastes and the process for producing battery plates. In particular, a battery paste composition and a process for producing battery plates for lead acid batteries without the need for curing is disclosed. More specifically, the present disclosure comprises a battery paste composition incorporating and promoting the formation of tetra basic lead sulfate (TTBLS), wherein elimination of free lead takes place during paste mixing and subsequent plate drying. As a result, the curing process is eliminated and the resultant positive and/or negative battery plates can be used in the battery immediately following drying. Improved battery performance characteristics are also realized.

BACKGROUND OF THE INVENTION

Traditional methods for producing battery plates for lead-acid batteries generally involve a mixing, curing and drying operation in which the active materials in the battery paste undergo chemical and physical changes that are used to establish the chemical and physical structure and subsequent mechanical strength necessary to form the battery plate. To produce typical battery plates, materials are added to commercial paste mixing machines common in the industry in the order of lead oxide, flock, water and sulfuric acid, which are then mixed to a paste consistency. Conventional additives such as a flock or expander may also be used to modify the properties of the paste and the performance of the plates produced therefore. During mixing, chemical reactions take place in the paste producing basic lead sulfates, the most common of which is tribasic lead sulfate. The final paste composition is a mixture of basic lead sulfates, unreacted lead monoxide and residual free lead particles.

Pasting is the process of making a battery plate from the paste mix. This paste is dispensed into a commercial automatic pasting machine of a type common in the industry which applies the paste to a grid structure composed of a lead alloy. The paste is dispensed into a hopper on the pasting machine and from there the paste is applied to the grids at high speed. The pasted plates are generally surface dried in a tunnel dryer of a type common in the industry and then either stacked in columns or placed on racks. The stacked or racked plates are then placed in heated curing chambers. In these chambers the plates are subjected to temperatures of 70° C.-80° C. in a high humidity atmosphere for up to several days to convert the tribasic lead sulfate in the plates to tetra basic lead sulfate and to allow oxidation of the residual free lead. The plates are then dried, and the finished plates are then ready for assembly into batteries.

Two key factors important in the curing process are the formation of a proper crystal structure by converting tribasic lead sulfate (TRBLS) formed during paste mixing into tetra basic lead sulfate (TTBLS), and the formation of tetragonal lead oxide by oxidizing residual free lead metal. Generally, a crystal structure high in tetra basic lead sulfate will increase battery life. The general formula for converting tribasic lead sulfate to tetra basic lead sulfate is set forth below:

$$3PbO \cdot PbSO_4 \cdot H_2O + PbO \longrightarrow 4PbO \cdot PbSO_4 + H_2O$$

A common problem with traditional battery paste compositions and methods for curing is that the chemical characteristics of the resultant plates are not uniform, varying in quality. Other common problems include difficulty in the repeatability of production, uncertain and/or lengthy curing time, the large number of curing chambers needed to process plates, and high capital and energy costs. Overall, the curing process is labor, capital and energy intensive and the composition of the plates is frequently variable which leads to variability in the batteries that are made from them.

Consequently, a need exists for improvements in battery pastes which may be used with conventional paste mixing processes, procedures and equipment to produce positive and/or negative battery plates having greater uniformity, more consistent quality, more consistent reproducibility, all while eliminating the curing process, procedure and equipment so as to reduce the cost and speed up the production of batteries.

Various processes and procedures for battery pastes and the production of battery plates are known. The following is a discussion of such known processes and procedures.

U.S. Pat. No. 5,302,476 entitled "High Performance Positive Electrode for a Lead-acid Battery," issued to Kao et al. on Apr. 12, 1994, discloses battery paste compositions and methods of using the paste to make electrodes suitable for use as a lead-acid battery plate. The paste consists essentially of a basic lead sulfate component, preferably a mixture of about 0-100% TRBLS and about 0-75% TTBLS, a persulfate salt such as sodium persulfate, potassium persulfate, calcium persulfate or ammonium persulfate, lead oxide and preferably 10-30% water. The paste is applied to the surface of an electrode, which is then air dried prior to formation. The electrode is formed in excess sulfuric acid by passing a constant current through the electrode for a sufficient period of time.

Kao et al.'s paste differs from the battery paste of the present disclosure, for example, by utilizing a persufate as an oxidizing agent, which the battery paste of the present disclosure does not use. Another difference, for example, is in the use of conductive metal oxides in Kao et al.'s paste, which the battery paste of the present disclosure does not use. Further, Kao et al.'s paste does not disclose a micronized tetra basic lead sulfate nor a low-free-lead oxide as in the battery paste of the present disclosure. The battery paste of the present disclosure does not require the addition of an oxidizing agent or a conductive additive. Additionally, the methods for producing the respective battery plates differ significantly.

U.S. Pat. No. 6,755,874 and U.S. Patent Application No. 2002/0124388, both entitled "Plate Making Process for Lead Acid Battery, issued and published to Chen et al. on Jun. 29, 2004 and Sep. 12, 2002 respectively, disclose plate making processes for lead-acid batteries wherein the steps of mixing, reacting and crystallizing occur in a closed reactor under controlled temperature and mixing conditions to produce a paste having the desired crystal morphology. A polymer is then added to the paste to bind the crystals together and to produce desired rheological properties in the paste.

Unlike the paste of the present disclosure, Chen et al.'s paste is made in situ by heating leady oxide and sulfuric acid in a mixer until tetra basic lead sulfate is formed. The resulting paste is combined with a polymer to give strength to the battery plates. This differs substantially from the paste of the present disclosure which is made from a low (or no) free lead oxide and micronized tetra basic lead sulfate.

U.S. Pat. No. 4,713,304, entitled "Method of Preparing Lead-Acid Battery Plates and Lead-Acid Batteries Containing Plates So Prepared," issued to Rao et al. on Dec. 15, 1987, discloses a method for preparing lead-acid battery positive and negative battery plates. The method comprises the steps of applying wet leady oxide paste to battery grids to form plates, optionally wrapping the freshly pasted plates with an absorbent material, and initiating formation of the plates while the plates contain more than about 5 wt. % free lead in the paste and are generally damp from moisture existing in the paste from the time of plate pasting.

Rao et al.'s paste differs considerably from the paste of the present disclosure, for example, by making a paste from conventional materials and then wrapping the wet, uncured plates in an absorbent material and assembling the battery from the resulting wrapped plates. The plates are then charged in the battery container. It should be readily apparent that the method of producing the respective battery plates differs significantly.

U.S. Pat. No. 5,314,766 entitled "Lead-Acid Battery Electrode and Method of Manufacture" and U.S. Pat. No. 5,252,105 entitled "Method of Forming Lead-Acid Battery Electrode," issued to Witherspoon et al. on May 24, 1994 and Oct. 12, 1993 respectively, each disclose paste compositions and methods of forming lead-acid battery electrodes for lead-acid batteries.

With respect to the '776 patent, a "pre-charged" positive electrode is made from partially oxidized tetra basic lead sulfate mixed with lead dioxide and binders. The wet mixture is applied to the oxidized surface of a lead support substrate, and then heated and pressed for a time and at a temperature and compressive load sufficient to form an adhered or retained coating of active material on the substrate. It should be readily apparent that the method of producing the respective battery plates differs significantly.

With respect to the '105 patent, a battery paste is made from a mixture of monobasic lead sulfate and red lead which is pasted onto a grid and then heated for up to 30 minutes. Tetra basic lead sulfate is formed during the heating step. Again, it should be readily apparent that the method of producing the respective battery plates differs significantly.

U.S. Pat. No. 5,290,359 entitled "Apparatus for Production of a Battery Paste," issued to Coonen et al. on Mar. 1, 1994, and U.S. Pat. No. 5,096,611 entitled "Process for the Production of Battery Paste," issued to Matthew et al. (sic) on Mar. 17, 1992, disclose a process for making battery paste which includes producing a slurry containing tri- and tetra-based lead sulfates, formed in a continuously stirred tank reactor. The process of these patents involves a complex series of mechanical and process steps to make battery paste in a continuous manner. It also uses an oxidizing agent in the paste. The methods for producing these battery plates and the battery plate of the present disclosure differ significantly.

The present disclosure overcomes the disadvantages and/or shortcomings of known prior art battery pastes and methods for producing battery plates, and provides a significant improvement thereover. The present disclosure provides improvements in battery pastes which may be used with conventional paste mixing processes, procedures and equipment to produce positive and/or negative battery plates having greater uniformity, more consistent quality, more consistent reproducibility, all while eliminating the curing process, procedure and equipment so as to reduce the cost and speed up the production of batteries.

SUMMARY OF THE INVENTION

The present disclosure relates to a battery paste composition incorporating and promoting the formation of tetra basic lead sulfate and the elimination of free lead during paste mixing. Battery plates utilizing the disclosed battery paste composition are produced without the need for curing, and instead can be used in the battery immediately following drying. Improved battery performance characteristics are also realized since the plates are more uniform, etc.

To achieve the correct chemical composition of the paste without curing, 0.10%-5.0% of tetra basic lead sulfate having a particle size in the range of 0.50-5.0 microns is added to the paste mix. A larger particle size, for example as large as 10 microns, can be used, but this is less effective than the smaller crystals. The added TTBLS promotes the formation of more TTBLS so that the finished paste contains 40%-85% TTBLS depending on the degree of sulfation of the paste. During drying, more TTBLS is formed such that the resulting pasted and dried plate contains 60%-90% TTBLS. The amount of tetra basic lead sulfate in the plate is determined by the amount of sulfuric acid added during paste mixing. Lower or greater amounts can result if the amount of sulfuric acid is lowered or increased.

To eliminate the free lead in the paste without curing, a special oxide is used which contains a lower than normal amount of free lead which reduces the residual amount in the paste following mixing. Oxides with a range of free lead from 0-30% are suitable for this purpose but have, preferably, less than 20% free lead. The residual free lead in the oxide is converted to lead oxide and tribasic lead sulfate during paste mixing. Therefore, the resulting paste has a free lead content of less than 5%. During drying, the remaining free lead is oxidized and converted to lead oxide such that the resulting pasted and dried plate contains less than 2% free lead. A variety of these special lead oxides can be used in the present disclosure as discussed below.

Accordingly, an object of the present disclosure is to provide a battery paste composition incorporating and promoting the formation of tetra basic lead sulfate and the elimination of free lead during paste mixing.

Another object of the present disclosure is to provide a process for producing battery plates that eliminates the curing process.

Yet another object of the present disclosure is to provide a cureless battery paste that may be used with conventional paste mixing procedures and equipment.

Yet another object of the present disclosure is to provide a battery paste that improves the mechanical and physical strength of the resulting battery plate.

Yet another object of the present disclosure is to create battery plates which are uniform in physical structure and quality.

Yet another object of the present disclosure is to provide a battery paste allowing battery pastes and plates to be consistently reproducible.

Yet another object of the present disclosure is to provide a battery paste which is used to produce plates that do not need to be cured.

Yet another object of the present disclosure is to provide a cureless battery paste that may be used to produce positive battery plates.

Yet another object of the present disclosure is to provide a cureless battery paste which may be used to produce negative battery plates.

Yet another object of the present disclosure is to provide a battery paste that reduces costs and speeds up the production of the batteries.

Numerous other objects, features and advantages of the present disclosure will become readily apparent from the detailed description and from the claims which follow.

BRIEF DESCRIPTION OF THE DRAWINGS

FIG. 1B (PRIOR ART) is a table of typical properties of lead-acid battery leady oxides.

FIG. 2 is a table of examples of special lead oxides for use in the cureless battery pastes of the present disclosure.

FIG. 3A is a table of the components for examples of automotive and industrial battery paste mixes used in the formation of the positive and negative lead-acid battery plates of the present disclosure.

FIG. 3B is another table of the components for examples of automotive and industrial battery paste mixes used in the formation of the positive and negative lead-acid battery plates of the Examples shown in FIGS. 4A-5C.

DETAILED DESCRIPTION OF THE PREFERRED EMBODIMENT

While the present disclosure is susceptible of embodiment in many different forms, there will be described herein in detail, preferred and alternate embodiments of the present disclosure. It should be understood however, that the present disclosure is to be considered an exemplification of the principles of the invention and is not intended to limit the spirit and scope of the invention and/or claims of the embodiments illustrated.

Figure 1A:
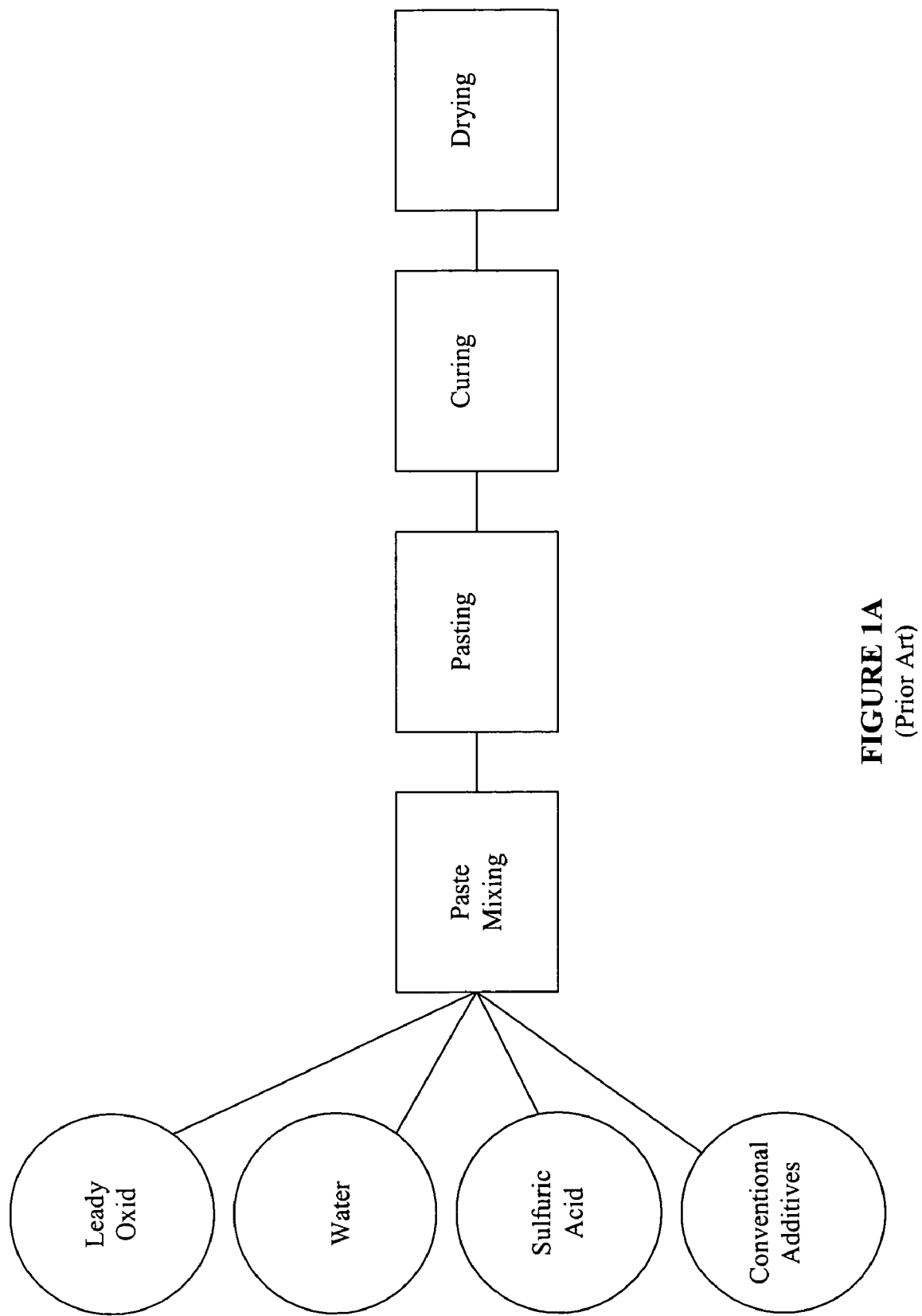
FIG. 1A (PRIOR ART) is a flow diagram of a typical curing process in the production of battery plates.
Figure 1C:
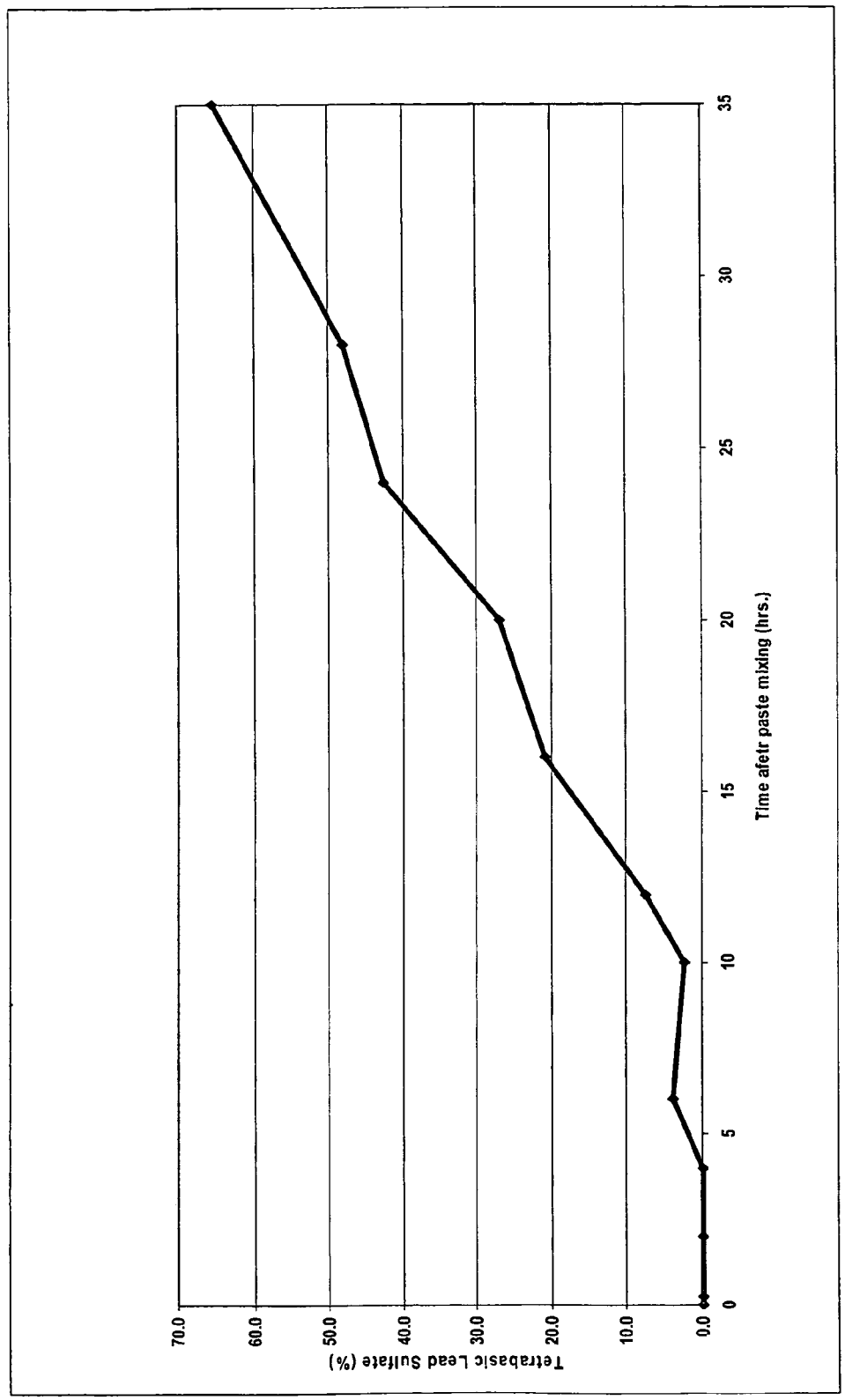
FIG. 1C (PRIOR ART) is a graph of the percentage of tetra basic lead sulfate in typical battery pastes over time, for positive plates produced from leady oxide and conventional curing.

FIG. 1A is a flow diagram of a typical process for the production of conventional battery plates. As can be seen in FIG. 1A, a typical battery plate is made from a paste comprising a leady oxide, water, sulfuric acid and conventional additives, which are mixed during the step of paste mixing. Following the paste mixing is the step of pasting the plates. Following the pasting of the plates is the step of curing the pasted plates. Finally, following the curing of the plates is the step of drying the cured plates.

Specifications for typical leady oxides used in automotive battery plates and industrial battery plates are shown in FIG. 1B. It can be seen that these leady oxides contain a substantial amount of lead metal. In oxides for automotive batteries, this is in the range of 19% to 27%, while for industrial batteries, the range is generally 21% to 31%. This large amount of free lead is a problem or disadvantage in the production of battery plates since it has to be removed before the plates can be used to make batteries. Removal of this free lead is achieved primarily in the plate curing process which considerably increases the time, cost and complexity of making the plates.

The curing stage illustrated in FIG. 1B is necessary for several reasons: it converts tribasic lead sulfate in the paste to the more desirable tetra basic lead sulfate, and it also oxidizes residual free lead in the paste to lead oxide. At the beginning of the curing process, the paste contains lead metal, lead monoxide (tetragonal and orthorhombic phases) and tribasic lead sulfate. Conventional additives may also be added to the paste. After the curing process, the composition of the paste has been converted to a mixture of tetra basic lead sulfate and lead monoxide.

However, it would be extremely beneficial if this typical lead removal process or curing process could be eliminated or at least reduced. Towards that end, the present disclosure utilizes a special oxide which contains a lower amount of free lead than a conventional leady oxide generally used to produce lead-acid battery plates. Accordingly, the present disclosure can eliminate or at least substantially reduce the process involving lead oxidation to lead monoxide by using a precursor oxide that is lower in residual metallic lead than conventional leady oxide. By using an oxide with a metallic lead content less than 20% by weight, and in conjunction with tetra basic lead sulfate seed crystals, a paste can be produced that contains a high level of tetra basic lead sulfate and a free metallic lead content less than 2% by weight. Such a paste allows the curing process to be eliminated, and the plates only require drying before use.

A variety of different oxides can be used for this purpose, as identified in FIG. 2. It is foreseen, however, that other similar materials, not specifically listed in FIG. 2, could likewise be used. It should thus be understood that the oxides identified in FIG. 2 are exemplary, and FIG. 2 should not be construed as excluding other similar materials.

As disclosed herein, the special oxide is used in conjunction with TTBLS seed crystals. The TTBLS seed crystals are made and are then added to the battery paste during paste mixing to improve the processing and the performance of battery plates. The TTBLS seed crystals preferably have a median particle size from approximately 0.5 to 5.0 microns (preferably approximately one micron).

These seed crystals are produced by a slow method of sulfuric acid addition to lead oxide, preferably in the form of HT-100 lead monoxide (99% or greater orthorhombic lead oxide raw material which is produced in a high temperature barton reactor followed by particle segregation via air classification, and due to its high reactivity, reacts with sulfuric acid and forms predominantly TTBLS crystals, resulting in a high percentage of TTBLS) and water to form TTBLS crystals which are subsequently centrifuged, dried and micromilled to produce micronized TTBLS crystals. Lead oxide manufactured by other methods such as by calcined leady oxide or by chemical reaction can also be used, but these are less reactive than HT-100 oxide which reduces the rate of reaction with sulfuric acid during the manufacturing process.

The micronized TTBLS crystals are added to the paste during mixing, at a dosing level of approximately 0.25% to 5.00% of the weight of lead oxide in the mix, to accelerate and increase formation of tetra basic lead sulfate from tribasic lead sulfate in the battery paste. The micronized small crystals of tetra basic lead sulfate act as seeds or nucleation sites for formation of more TTBLS during paste mixing. The seed crystals eliminate the need for energy of crystallization, accelerating the conversion of tribasic lead sulfate to TTBLS.

Preferably, the above-described production of tetra basic lead sulfate crystals and milling process is used to produce micronized tetra basic lead sulfate crystals. The milling process breaks individual crystals into smaller particles. The resultant fine material of micronized TTBLS seed crystals may be used as a battery paste additive for greater production of TTBLS in the paste, as described in more detail below. Preferably, dry milling, without requiring the use of a grinding medium such as sand, is used to micronize the TTBLS crystals formed from the mixtures above. A hopper may be used to store and/or transfer the TTBLS product to the micromill. While a dry micromill process is described herein, any other methods known in the art for producing and/or separating fine particles of TTBLS may be used to produce the battery paste additive, so long as the advantages and features of the present disclosure are realized.

In the preferred embodiment of the present disclosure, after a first batch of micronized TTBLS crystals is made, a second batch of micronized TTBLS crystals is made in the same manner, except that the micronized TTBLS crystals from the first batch are added as a component in the second batch. The micronized TTBLS crystals initially produced by the above-described procedure (first batch) is then used as a component of a subsequent mixture. As described below, the subsequent mixture is the same mixture as the initial mixture, with the addition of micronized TTBLS crystals.

Use of the initial micronized seed crystals from the first batch in the subsequent mixture (second batch) to produce the micronized TTBLS seed crystal additive performs essentially the same function that the micronized TTBLS seed crystal additive provides in the paste, promoting formation of TTBLS, and results in higher and more consistent purity of the TTBLS crystals produced. The resultant product of the subsequent mixture (second batch) may then be used as a battery paste additive. In an alternative embodiment, the initial mixture alone, without making the subsequent mixture, may be used as a battery paste additive.

Initial Mixture: In general, the production of the micronized tetra basic lead sulfate crystal additive uses an initial mixture of 1-90% (preferably approximately 75%), by total formula weight water, at a temperature between 0-100° C. (preferably between 50-100° C., and ideally approximately 90-100° C.); 10-70% (preferably approximately 15-20%) by total formula weight lead oxide; and 0.05-12% (preferably approximately 3-7%) by total formula weight dilute sulfuric acid ($H_2SO_4$) at a 1-99% concentration (preferably approximately at a 20-50% concentration, and ideally approximately at a 35% concentration). The sulfuric acid is added at two different times, as discussed below.

The initial mixture may be mixed in a reactor according to the following preferred procedure. The water is added to the reactor, mixing is begun, and the water is heated to the desired temperature, preferably approximately 90-100° C. The reactor water is then acidified with approximately 0.05-2.00%, preferably 0.05%, by total formula weight dilute sulfuric acid until the water is acidified at a pH of approximately equal or less than 2. The lead oxide is then added to the acidified water. Approximately 5-10%, preferably 5%, by total formula weight dilute sulfuric acid is then added to the mixture by a slow constant rate of sulfuric acid solution addition, as described below. Once sulfuric acid solution addition has completed, when the pH reaches approximately 9.5-8.5, the resultant initial mixture is centrifuged to remove excess water, the solid product is dried in a dryer, and then run through a hopper and a micromill to produce micronized TTBLS crystals. The resultant product is micronized TTBLS crystals. The dried sample may then be analyzed, and may also be analyzed prior to being run through the hopper and micromill.

Preferably, the micronized TTBLS product from the initial mixture or first batch above is then used in a subsequent mixture or second batch to produce the micronized TTBLS crystals paste additive. The subsequent mixture (second batch) and procedure is identical to the initial mixture, except for the addition of 0.01-5.00% by total formula weight, preferably 0.01%, micronized TTBLS from the initial mixture (first batch), preferably added after the addition of lead oxide and prior to the addition of sulfuric acid, to the mixture. The same procedure described for the initial mixture (first batch) is followed in the subsequent mixture (second batch). The dried, micromilled product of the subsequent mixture (second batch) may then be used as a battery paste additive. Use of the micronized crystal product from the initial mixture (first batch) in the subsequent mixture (second batch) promotes formation of TTBLS, resulting in a higher percentage of TTBLS crystals (or purity) and more consistent purity of the TTBLS crystals produced than the micronized TTBLS produced from the initial mixture. Alternatively, the micronized TTBLS product from the initial mixture may be used as the battery paste additive.

Sulfuric Acid Solution Addition: The following procedure is preferable for both the initial and subsequent mixtures described above. The initial weight of sulfuric acid and the weight of the sulfuric acid in the reactor is recorded and monitored at incremental periods of time, preferably every half hour. With the temperature at approximately 90-100° C., sulfuric acid solution addition using approximately 35% sulfuric acid is commenced and proceeds at a constant rate for approximately 2.5-4 hours. The total amount of sulfuric acid used in the addition process is approximately 5% by total formula weight.

Preferably, the sulfuric acid is added to the water/lead-oxide mixture slowly, at a constant rate of approximately 30-40 lbs/hour, preferably 30 lbs/hour, with vigorous mixing such that the rate of sulfuric acid addition allows for the formation of tetra basic lead sulfate. This slow addition of dilute acid favors the formation of tetra basic lead sulfate due to the localized in-situ stoichiometry providing an excess of lead oxide (PbO) molecules. By providing an environment rich with excess lead oxide molecules and dispersing the sulfuric acid rapidly due to vigorous mixing, a limited number of sulfuric acid molecules favor formation of tetra basic lead sulfate, with each sulfuric acid molecule bonding with five (5) PbO molecules, as shown in the chemical reactions below. An addition rate of sulfuric acid which is too rapid may result in the formation of tribasic lead sulfate rather than tetra basic lead sulfate, as illustrated below.

5PbO+H$_2$SO$_4$→4PbO·PbSO$_4$+H$_2$O (Tetra basic lead sulfate)

4PbO+H$_2$SO$_4$→3PbO·PbSO$_4$·H$_2$O (Tribasic lead sulfate)

After approximately two hours of sulfuric acid addition, the temperature, pH and weight of the sulfuric acid are monitored. The pH should preferably be approximately 10-11. After approximately 2.5 hours of sulfuric acid addition, the reactor batch may be sampled every fifteen minutes to check the pH. The sulfuric acid addition is preferably stopped when the pH is approximately 8.5-9.5. The resultant TTBLS crystal product may be sampled and analyzed for properties including the amount of lead, pH and X-ray diffraction (XRD) analysis to measure the amount of lead sulfate and lead oxide in the sample. The product is then centrifuged, dried in drying pans and in a drier and analyzed for properties including particle size and humidity. Larger particles may be micromilled again to produce TTBLS crystals of the desired size.

The reaction of lead oxide (PbO) with sulfuric acid (H$_2$SO$_4$) is exothermic and it is preferable to avoid boiling temperatures, such as those exceeding approximately 99-101° C. as foaming and batch overflow may result. If the temperature exceeds approximately 99-101° C., cool water may be applied until the temperature drops to below approximately 95-99° C.

Preferably, the resultant dried TTBLS micronized seed crystals will have a lead content of approximately 90.5-93.3% lead oxide by weight and a TTBLS content of approximately 90% or more TTBLS by weight. The lead content of the product may be measured by EDTA titration and may be used to determine that the proper ratio of sulfuric acid has been added. The TTBLS content may be measured by x-ray diffraction and may be used to determine the purity of the product. The resultant TTBLS product will also preferably have approximately 1.0% wt/wt or less moisture/humidity by weight, and a median particle size of approximately 0.5-5.0 microns, preferably one micron or less, and an appearance in color of tan yellow. TTBLS may discolor or blacken when exposed to ultraviolet light. It is therefore preferable to avoid extended exposure to UV light including sun and indoor lighting.

Although, a particular form of lead oxide, HT-100, which is high in orthorombic lead oxide, is preferred to produce the micronized seed crystals, any form of lead monoxide may be used. The resultant battery paste additive, when added to battery paste produces plates and batteries which have an increased battery life and performance, improved plate strength, and the processes for producing the additive and incorporating it into a battery paste are easily reproducible.

Although the addition of sulfuric acid to the initial and subsequent mixtures is preferably at a slow constant rate, such as that described above, other methods of sulfuric acid addition are foreseen, such as additions of sulfuric acid in multiple intervals, a slower rate of addition with less dilute sulfuric acid and/or a faster rate of addition with more dilute sulfuric acid. In addition, a continuous process in which sulfuric acid and lead oxide are combined into a continuous unbroken stream, eliminating the need for batch processing.

Although the procedure for micronizing the TTBLS crystals preferably requires centrifugation, drying, a hopper and a micromill, other methods of micronizing the TTBLS product are foreseen, such as crystal growth modification, sheer pumps, homogenization mills, wet milling, cryogenic grinding and/or air classification. The use of other chemicals such as sodium sulfate is not required to produce a small particle size for the paste additive.

The resultant micronized TTBLS may be used as a battery paste additive by mixing approximately 0.25-5.00%, preferably approximately 1.0%, by weight of the lead oxide in the paste mix, of the micronized TTBLS additive with conventional paste mixes using conventional paste mixers, and then using pasting machines and tunnel dryers under standard conditions using standard manufacturing mixing procedures.

In the paste of the present disclosure, in addition to the added micronized TTBLS, a special oxide is used during the mixing process to eliminate the free lead in the paste and thus the need for curing. The special oxide used contains less than 20% free lead, preferably in the range of 0%-10% free lead. The special oxide allows oxidation of the relatively small amount of lead existing in the paste during the preparation of the paste. The resulting paste has a free lead content of less than 5%, preferably less than 2%.

Use of TTBLS and Special Oxide in Paste Mixing and Plate Drying

Preferably, the amount of micronized TTBLS crystals added to the paste mix is approximately 0.25-5.00%, preferably approximately 1.0%, by weight of the lead oxide in the paste mix. An amount of micronized TTBLS crystals approximately 0.25-5.00%, preferably approximately 1.0%, by weight of the lead oxide in the paste mix is sufficient for use in both positive and negative plate paste mixes. The micronized TTBLS additive promotes and increases the formation of more TTBLS in the paste. TTBLS formation occurs during mixing, pasting and/or drying. The reaction conditions determine the rate of formation of TTBLS during each of the mixing, pasting and drying stages. The rate of formation is dependent on factors such as the temperature and time to prepare the paste mix.

Conventional paste mixing generally occurs at a temperature of approximately 45-65° C. In conventional paste mixes, TTBLS generally is not formed because this temperature is too low. The present disclosure allows formation of TTBLS in the paste during paste mixing at these low temperatures, as low as approximately 50° C. Due to the micronized TTBLS paste additive, a substantial amount of TTBLS, i.e., 40-75%, will be formed during the paste mixing even at a low temperature, eliminating the need for TTBLS formation to occur through a curing process.

In conventional paste mixes, at temperatures lower than 60° C., additional TTBLS formation is necessary during the curing process at a temperature of approximately 80° C. Generally, tetra basic lead sulfate will also be formed at temperatures lower than approximately 60° C. and can take place at approximately 40° C. However, at lower temperatures the rate of formation is reduced and the amount in the finished paste is also reduced. This can be offset by increasing the mixing time. This, however, increases the time to produce a paste mix beyond the 20-30 minute range preferred by the battery industry.

Once mixing is complete, the plates are pasted and then dried. During the drying process, more TTBLS is formed. The resulting pasted and dried plates contain approximately 60-80% TTBLS. Also during drying, the remaining free lead is oxidized and converted to lead oxide such that the resulting pasted and dried plate contains less than 2% free lead. A variety of lead oxides can be used in the present disclosure such as previously described with respect to FIG. 2.

The preferred embodiment of the disclosure may be used in a variety of battery applications, including but not limited to automotive and industrial battery plate production. The preferred embodiment of the present disclosure may be used with positive or negative battery pastes for production of either positive or negative battery plates.

The micronized TTBLS additive produces more TTBLS in the paste, speeds up conversion of TRBLS to TTBLS and improves plate to plate reproducibility. Use of the special oxide substantially eliminates the free lead in the paste and the resulting plates. As a result, the curing process can be eliminated.

Four exemplary lead-acid battery plate paste mixes prepared using the methods and additives described herein are set forth in FIG. 3A. FIG. 3A is a table identifying the amounts of each of the components of the four exemplary lead-acid battery plate paste mixes prepared using the methods and additives described herein. The examples in FIG. 3A illustrate examples of the addition of micronized TTBLS and use of the special oxide to paste mixes for automotive and industrial battery plates in lead-acid batteries. It should be understood that these examples are not intended to limit the choice and/or amounts of the components in the paste, and other components and/or amounts are contemplated so long as the disclosed features and/or advantages of the present disclosure are realized.

For the automotive positive plate paste mix, the specific gravity of the sulfuric acid in the mixture examples is preferably approximately 1.400 and the paste density is typically in the range of approximately 4.15-4.27 g/cc. For the automotive negative plate paste mix, the specific gravity of the sulfuric acid is preferably approximately 1.400 and the paste density is typically in the range of approximately 4.27-4.39 g/cc. For the industrial positive plate paste mix, the specific gravity of the sulfuric acid is preferably approximately 1.400 and the paste density is typically in the range of approximately 4.33-4.45 g/cc. For the industrial negative plate paste mix the specific gravity of the sulfuric acid is preferably approximately 1.400 and the paste density is typically in the range of approximately 4.45-4.57 g/cc.

The paste density is a measure of the composition of the paste and also of its suitability for being pasted by commercial paste mixing machines for the positive or negative plate paste mix. Paste density is determined by measuring the weight of paste required to fill a cup having constant volume of 50 cubic centimeters.

The "flock" component in FIG. 3A is a fibrous material, usually composed of polyester, nylon or modacrylic fibers, that is added to the paste to increase the mechanical strength of the pasted plate. The "expander" component in FIG. 3A is usually a mixture of barium sulfate, carbon black and lignosulfate that is added to the negative paste to improve the performance and life of the negative plate.

The battery paste mixes in FIG. 3A represent typical paste mixes used in the industry with the exception of the addition of the micronized TTBLS and the special oxide. To each paste mix, the micronized TTBLS additive was added at 1% of the weight of lead oxide in the paste mix. Additionally, the special oxide is used. The battery paste mixes of the type described in FIG. 3A were mixed and dried according to standard procedures using standard equipment, with the exception of the addition of the TTBLS and the special oxide. The particular mixes used and procedure for mixing and drying typically vary in the industry.

Additionally, three examples of paste mixes were made and plates were tested, after the mixing and drying process, against a control sample of a standard paste mix without the battery paste additive and special oxide of the present disclosure. FIG. 3B is a table identifying the amounts of each of the components of these three exemplary lead-acid battery plate paste mixes and the control sample. Example 1 is a paste mix made with a standard lead oxide and the micronized TTBLS additive. Example 2 is a paste mix made with a lead oxide with low free lead (15%) and the micronized TTBLS additive. Example 3 is a paste mix made with a lead oxide with free lead (0.3%) and the micronized TTBLS additive.

Figure 4A:
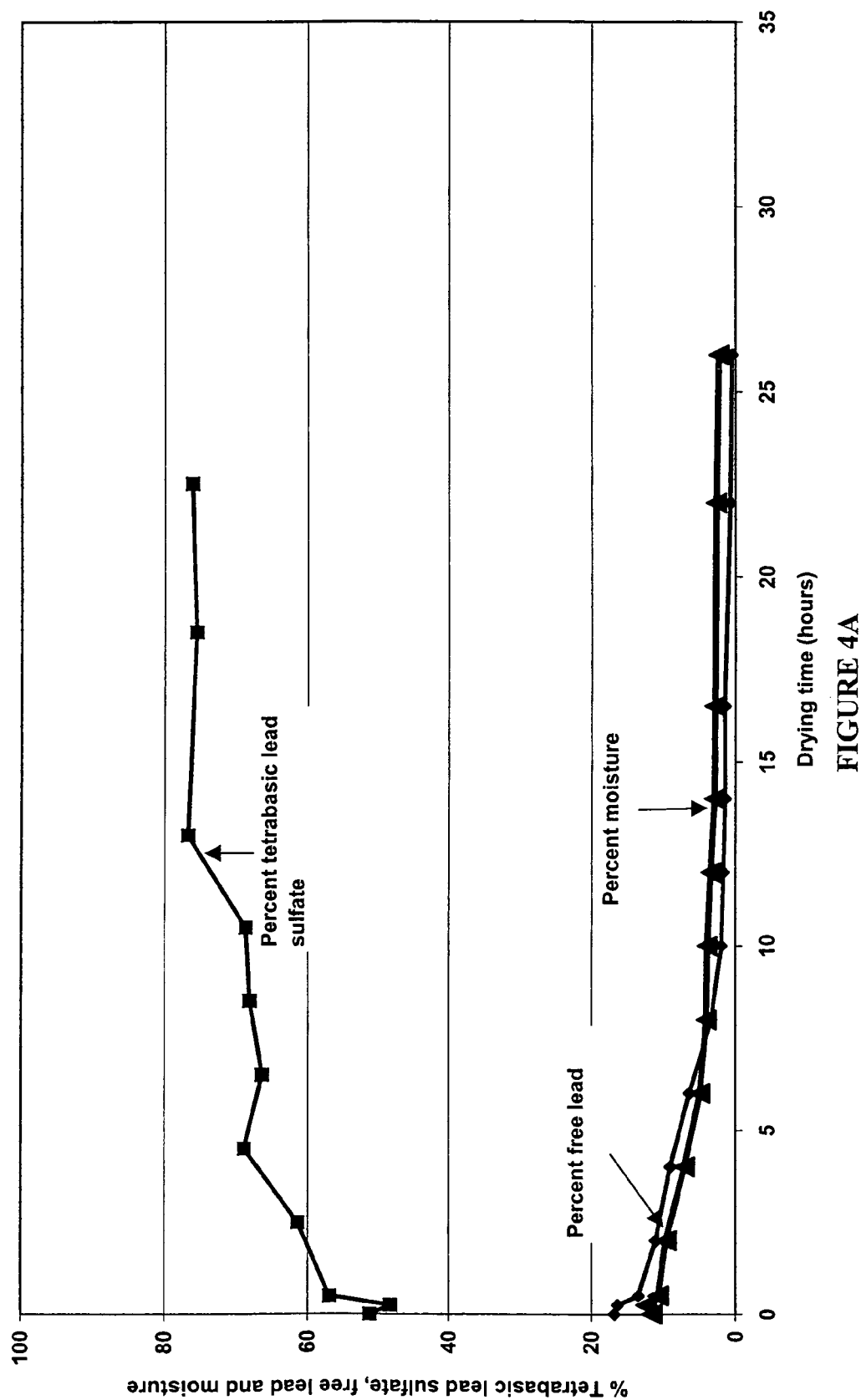
FIG. 4A is a graph of the results of the effect of 1% (by weight of lead oxide) of added TTBLS, as well a typical leady oxide as used by battery manufacturers, on typical lead-acid battery positive paste at the end of mixing, and during drying for a first sample (Example 1)
Figure 4B:
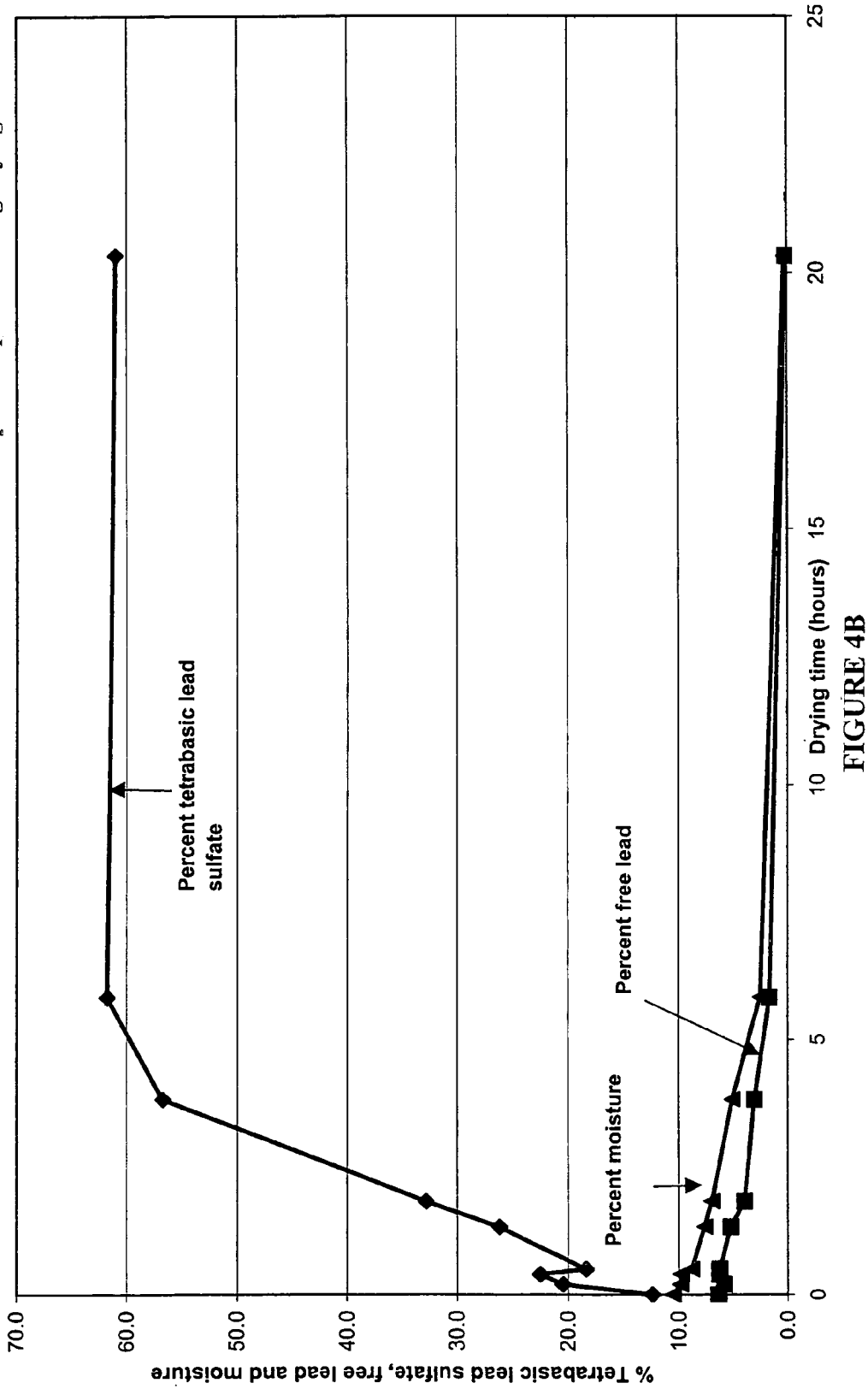
FIG. 4B is a graph of the results of the effect of 1% (by weight of lead oxide) of added TTBLS, as well as a special oxide with the free lead concentration reduced to 15%, on a typical lead-acid battery positive paste at the end of mixing, and during drying for a second sample (Example 2)
Figure 4C:
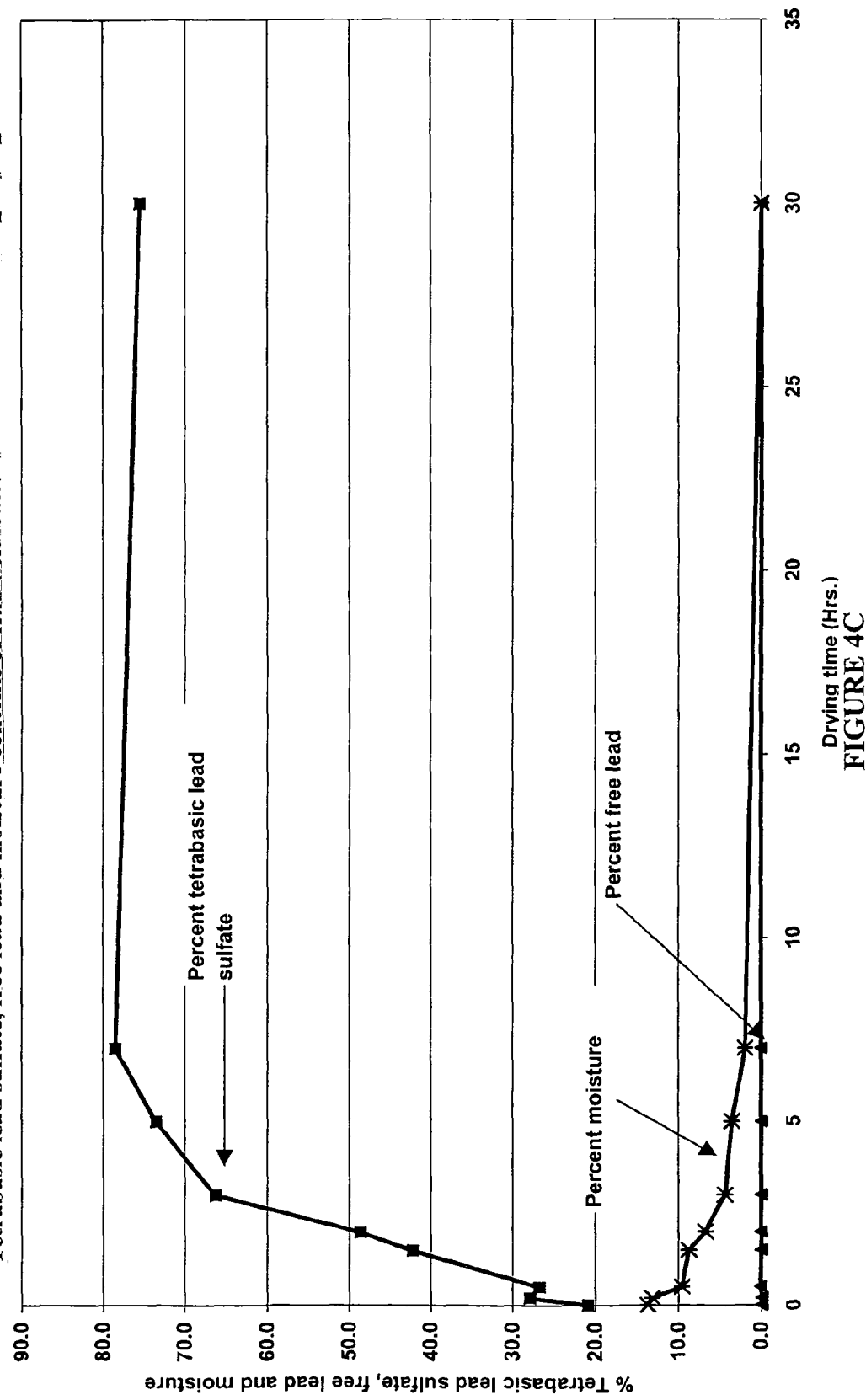
FIG. 4C is a graph of the results of the effect of 1% (by weight of lead oxide) of added TTBLS, as well as a special oxide containing essentially no free lead (0.3%), on a typical lead-acid battery positive paste at the end of mixing, and during drying for a third sample (Example 3)

The results of the tests on these three examples are shown in FIGS. 4A, 4B and 4C. The data in FIGS. 4A, 4B and 4C represents results from positive battery plate mixes containing the micronized TTBLS additive in an amount equal to approximately 1% by weight of the lead oxide, as well as use of the special oxide. Similar results were achieved in tests of negative plate paste mixes. As can be seen in FIGS. 4A, 4B and 4C, the resultant battery pastes with the additive and special oxide demonstrated improved characteristics over known battery paste compositions.

In FIGS. 4A, 4B and 4C, the resultant pastes and plates were tested using x-ray diffraction for the presence of several phases including the percent of TTBLS, free lead and moisture. The resultant paste mix and plates using the additive and special oxide demonstrated accelerated properties, eliminating the need for curing, and were determined to promote greater formation of TTBLS, and greater elimination of free lead, than in pastes without the additive and special oxide.

Figure 5A:
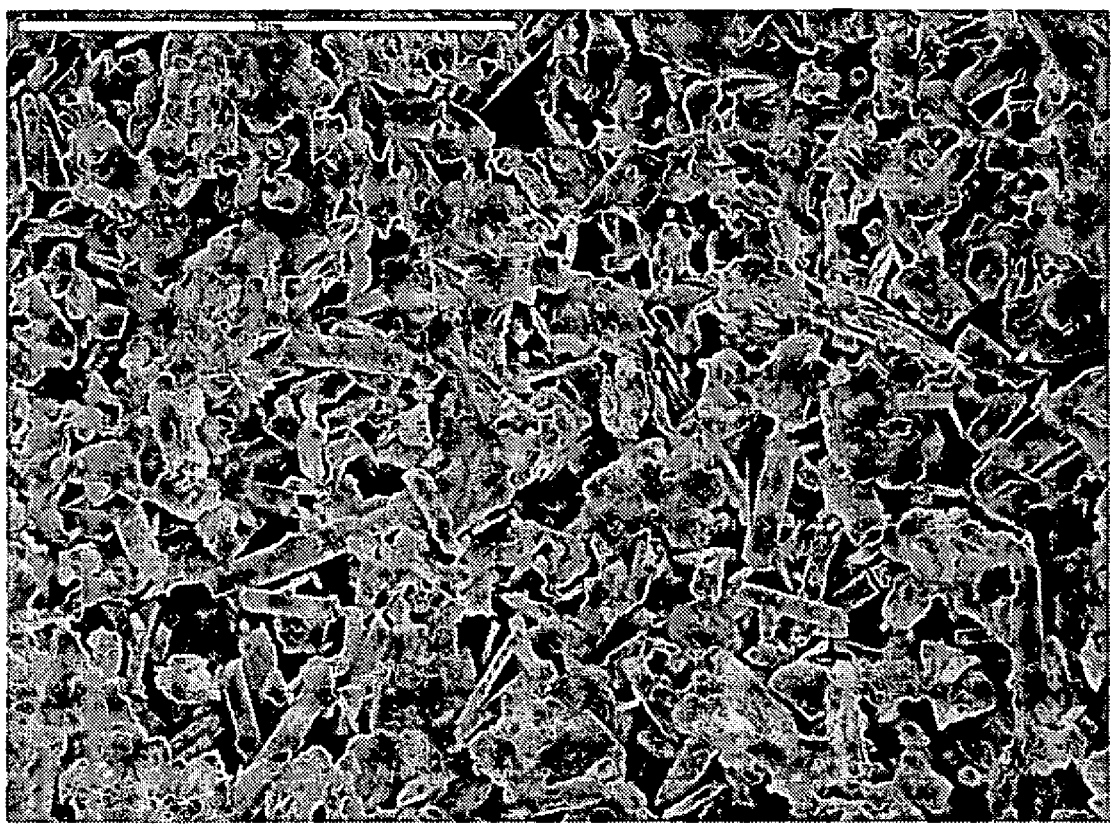
FIG. 5A is a scanning electron microscope image of the TTBLS crystal structure of the plate of Example 1 at a magnification of 3000.

FIGS. 4A, 4B and 4C show in graph form the results of the effect of 1% of the battery paste additive, and use of the special oxide, on industrial paste and plate drying for a first sample (Example 1, FIG. 4A), a second sample (Example 2, FIG. 5A), and a third sample (Example 3, FIG. 5A). The graphs shown in FIGS. 4A, 4B and 4C show the amount of tetra basic lead sulfate, free lead and moisture at the end of paste mixing and at the end of pasted plate drying, measured in percent content amounts. These experimental samples demonstrated significantly higher tetra basic lead sulfate content at the time intervals at the end of paste mixing and drying. As can be seen from the data in the figures, significantly greater TTBLS is formed during paste mixing, as well as during drying, in paste mixes containing the additive and special oxide than those without the additive and special oxide.

EXAMPLE 1

Standard Leady Oxide with 1% Micronized Tetra Basic Lead Sulfate

A typical positive paste mix was made from the formula shown in FIG. 3B. Following preparation of the paste, plates were pasted using conventional pasting technology and were then placed in a drying chamber. The atmosphere in the chamber was maintained at 54° C. (130° F.) and 98% relative humidity during loading of the chamber. When pasting was completed and the chamber was fully loaded the temperature was increased to 66° C. (150° F.) and the relative humidity reduced to 20% to dry the plates.

The results are shown in FIG. 4A. Tetra basic lead sulfate forms rapidly in the plates with formation of approximately 80% taking place during drying in approximately five hours. The free lead becomes oxidized to lead monoxide and is reduced to 2% in approximately 7.5 hours. The water content of the plates has dropped to approximately 2% in 10 hours. The complete process of pasting and drying can be accomplished in 10 hours at which time the plates are ready to be assembled into batteries.

EXAMPLE 2

Low Free Lead Oxide with 1% Micronized Tetra Basic Lead Sulfate

The plates in this example were produced in the same manner as in Example 1 and were dried under the same conditions. The oxide used in this example was a variation of leady oxide but with the amounts of free lead reduced to approximately 15%. In a similar manner to Example 1, tetra basic lead sulfate was formed rapidly in the plates so that complete conversion of tribasic lead sulfate to tetra basic lead sulfate had taken place during drying in less than 5 hours. Because of the reduced amount of free lead in the lead oxide, the elimination of residual free lead by oxidation is accelerated so that after only four hours it is below 2%. Therefore the plates from this example are ready for assembly after pasting and drying in as little as 4 hours.

EXAMPLE 3

Lead Monoxide with 0.30% Free Lead with 1% Micronized Tetra Basic Lead Sulfate

The special oxide used in this example was lead monoxide containing only 0.3% free lead. The plates were produced in the same manner as described in Examples 1 and 2. Tetra basic lead sulfate was formed during preparation of the paste as evidenced by over 50% being present in the finished paste. This rapidly increases to over 70% in approximately 2 hours during the drying process. Since the oxide used in this example had only 0.3% free lead there was no detectable free lead in the dried battery plates.

These examples show that lead-acid battery plates having a high concentration of tetra basic lead sulfate and less than 2% free lead can be produced by addition of micronized tetra basic lead sulfate to the paste mix followed by pasting and drying. With this process the plates can be used as soon as they are dried, usually in approximately 5 hours or less.

Crystal Morphology of the Plates

Figure 5B:
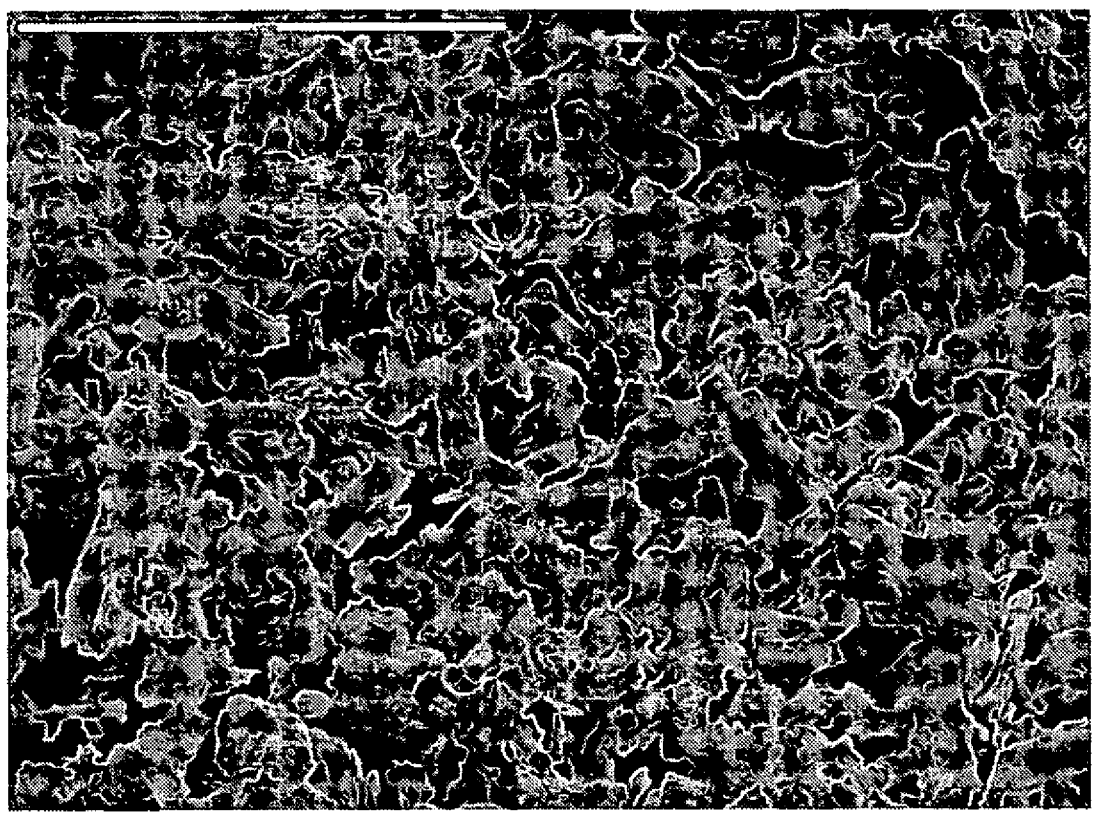
FIG. 5B is a scanning electron microscope image of the TTBLS crystal structure of the plate of Example 2 at a magnification of 3000.
Figure 5C:
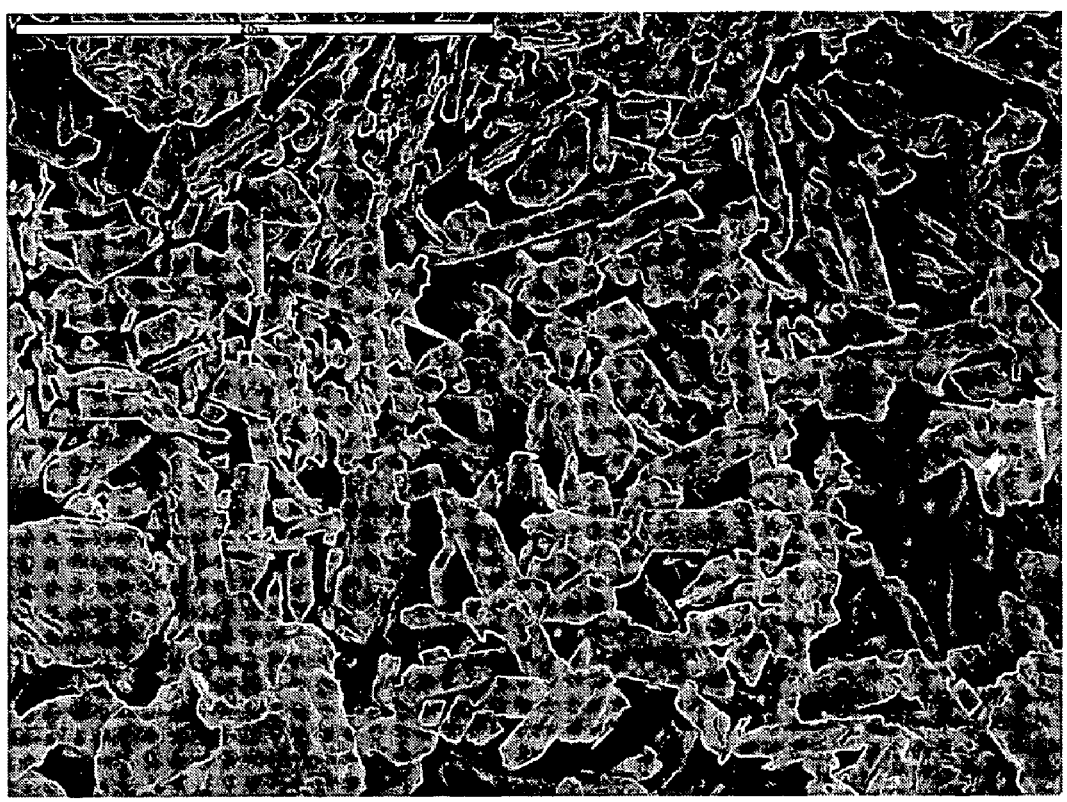
FIG. 5C is a scanning electron microscope image of the TTBLS crystal structure of the plate of Example 3 at a magnification of 3000.

The crystal morphology of the plates of Example 1, Example 2 and Example 3 are illustrated in FIGS. 5A, 5B and 5C respectively. The cureless paste of the present disclosure produces a plate with the beneficial structure of small, uniformly sized tetra basic lead sulfate crystals distributed in a matrix of unreacted lead oxide. This can be seen in the scanning electron microscope images of the three cited examples of plates following pasting and drying which show the crystal structure at a magnification of 3000.

Example 1, Conventional Leady Oxide

FIG. 5A shows the dried plate following pasting. The prismatic crystals of tetra basic lead sulfate (TTBLS) can be seen embedded in the matrix of unreacted lead monoxide. It is easily seen that the TTBLS crystals are small and relatively uniform in size with crystal lengths predominantly in the range of 3-10 microns.

Example 2, Leady Oxide with 15% Free Lead

FIG. 5B again shows the highly desirable structure of uniform, relatively small crystals of TTBLS embedded in the matrix of unreacted lead monoxide. The crystal sizes are in the range of 3-10 microns.

Example 3, Oxide with 0.15% Free Lead

FIG. 5C again shows the highly desirable structure of uniform, relatively small crystals of TTBLS embedded in the matrix of unreacted lead monoxide. The crystal sizes are in the range of 3-10 microns.

Figure 6:
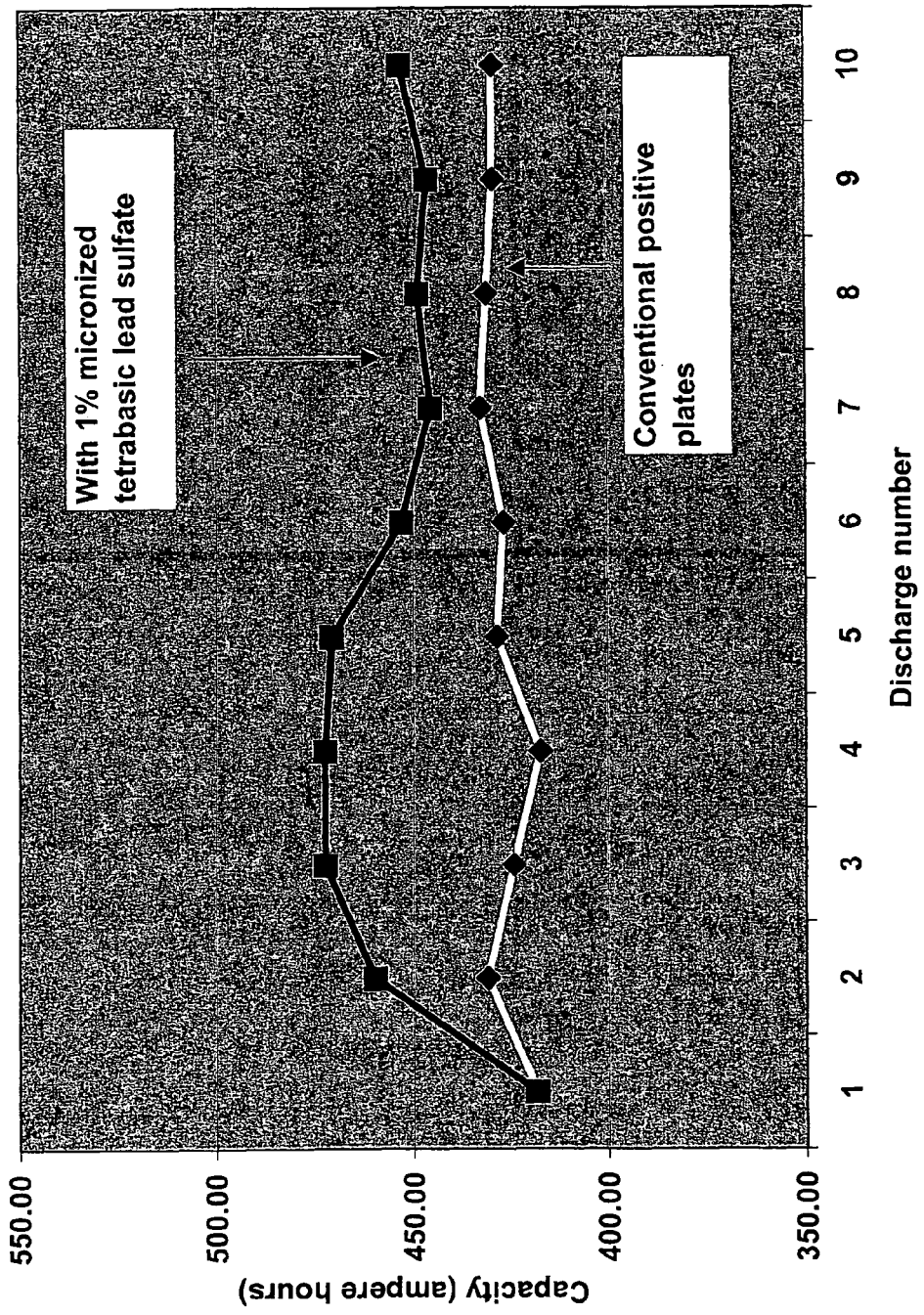
FIG. 6 is a graph of the effect of 1% (by weight of lead oxide) of added micronized TTBLS, as well as the special oxide, on the initial capacity of industrial battery cells.

Referring now to FIG. 6, the effect of 1% micronized TTBLS, and use of the special oxide, on initial capacity of motive power industrial battery cells, versus a control sample, tested at the 5-hour rate of discharge (the current drain (85 Amps) that will completely discharge a typical battery in five hours) rate. It can be seen that the capacity of the cells containing 1% micronized TTBLS and the special oxide is superior to those where conventional plates and paste formulas were used. A cycle is a battery discharge followed by a recharge.

Figure 7:
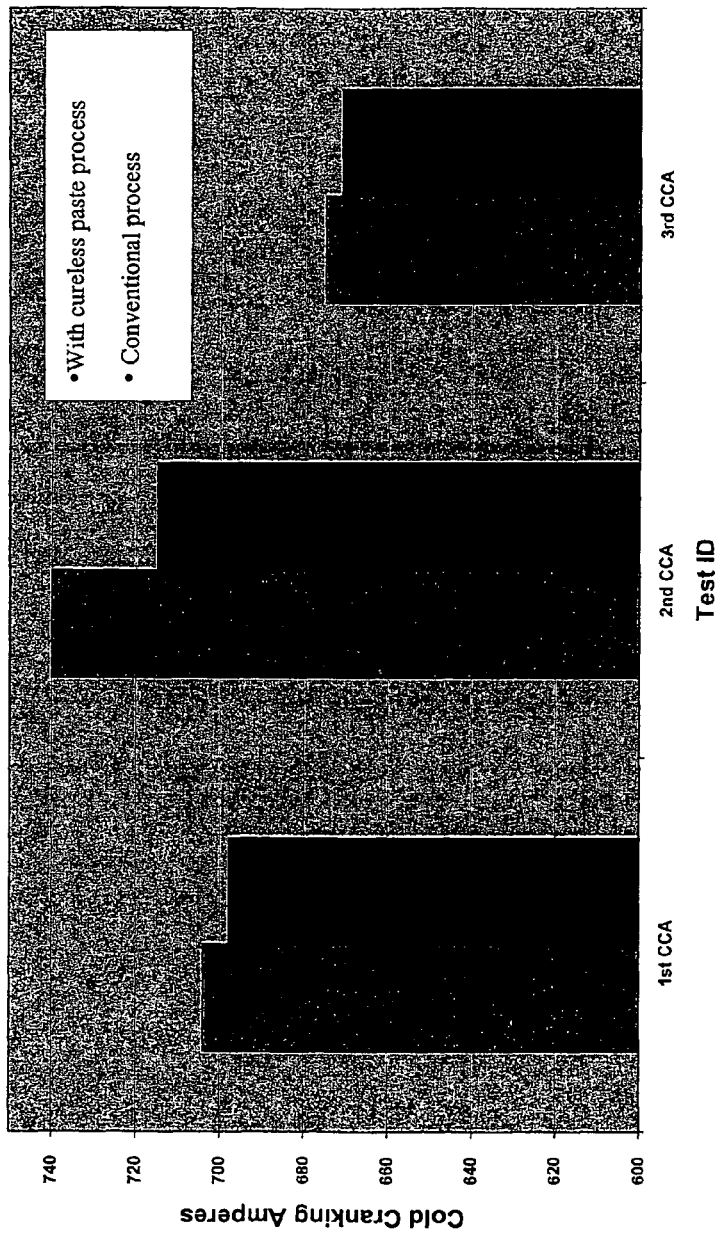
FIGS. 7-9 are graphs of the results of standard industry rating tests for automotive batteries comparing batteries made from the present disclosure and conventional batteries.
Figure 8:
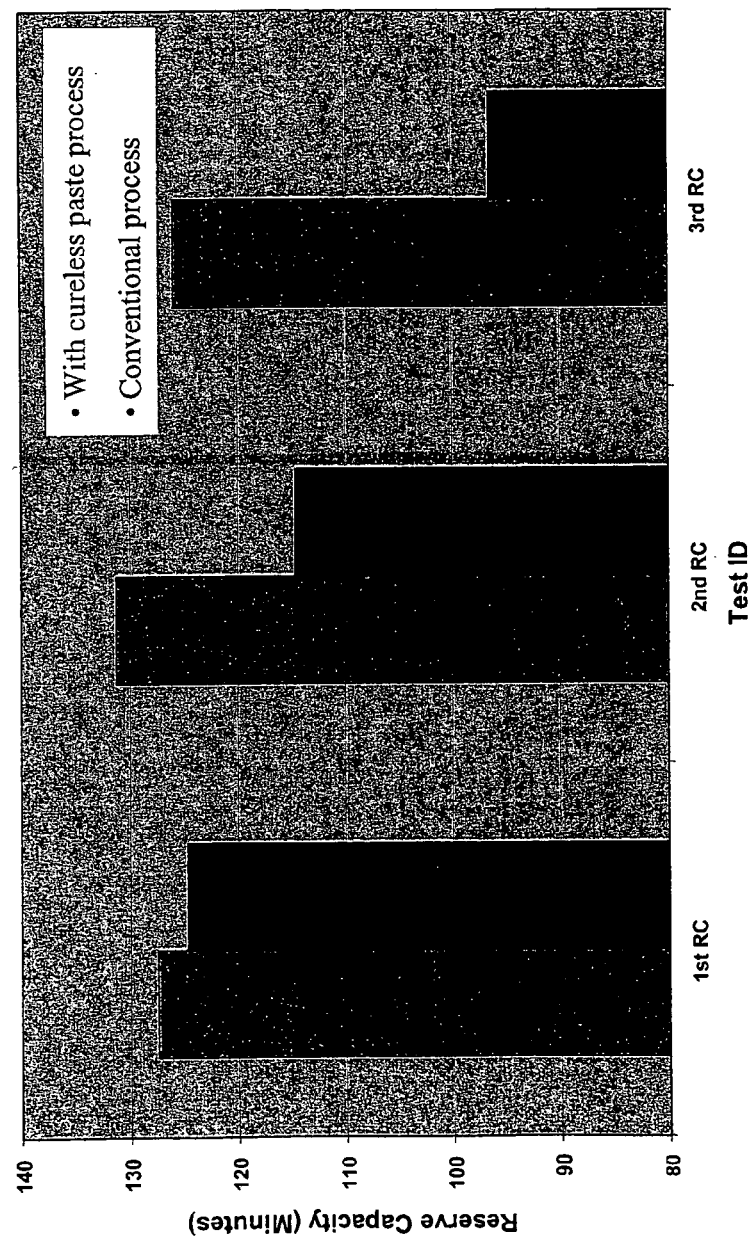
Figure 9:
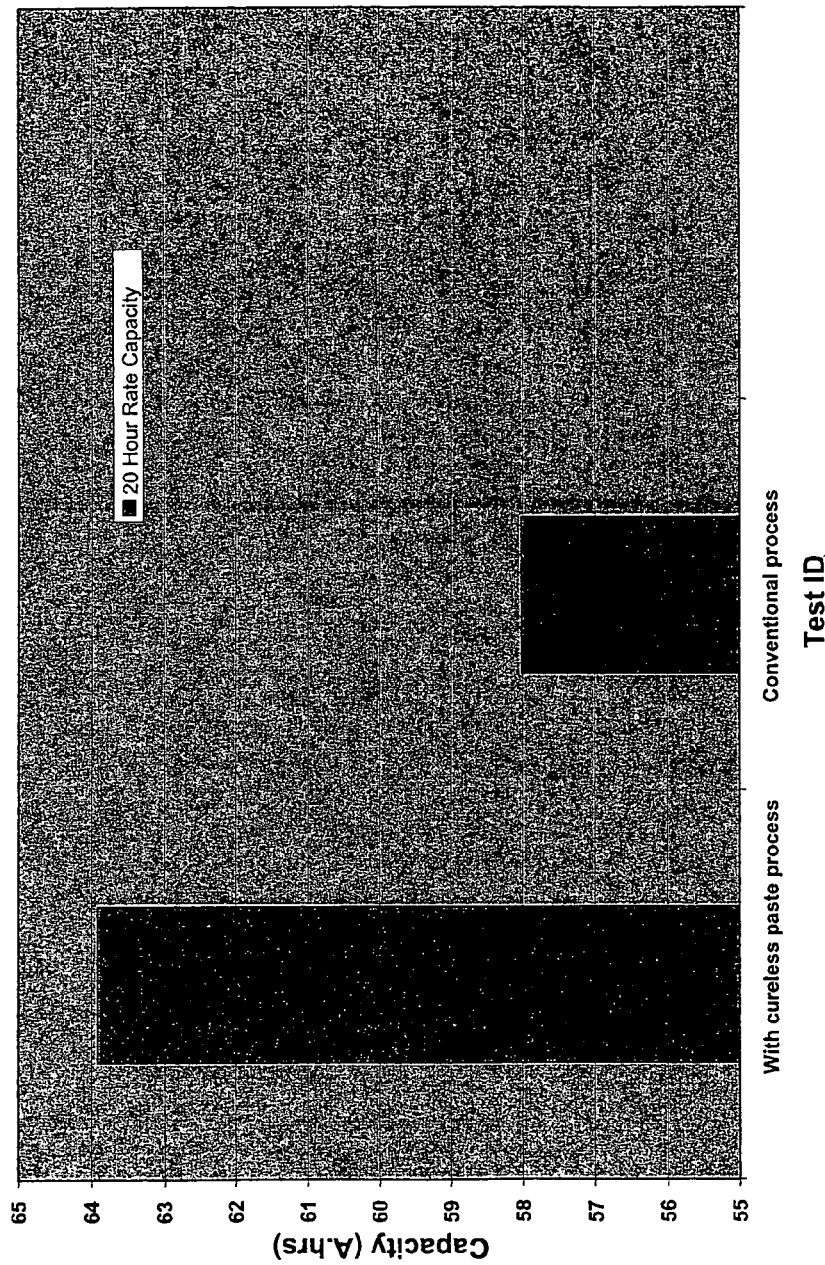

FIGS. 7-9 shows a comparison of test data from automotive batteries that were produced with the micronized TTBLS additive and special oxide, and automotive batteries without the micronized TTBLS additive and special oxide, showing test data for cold cranking amps (FIG. 7), reserve capacity (FIG. 8), and ampere hours at a 20 hour rate (FIG. 9), respectively. It can be seen that the Cold Cranking Amperes, Reserve Capacity and 20-hour Rate Capacity were all improved in the batteries containing 1% micronized TTBLS additive and special oxide in the paste used to produce the positive plates. The performance of automotive batteries is likewise improved when 1% micronized TTBLS additive and the special oxide are used in a negative paste mix for production of negative plates. These tests are standard industry rating tests for automotive batteries and are specified by the Battery Council International for testing automotive batteries.

In summary, as can be seen from the foregoing tests of the amounts of TTBLS and free lead oxide present in the battery paste mix at the end of the mixing and drying process, the present disclosure produces highly favorable results, while at the same time overcoming the disadvantages and/or shortcomings of known battery paste materials. Such results are an improvement over known prior art battery pastes and battery paste materials, as well as the methods for producing the same.

The foregoing specification describes only the preferred embodiment and alternate embodiments of the disclosure. Other embodiments besides the above may be articulated as well. The terms and expressions therefore serve only to describe the disclosure by example only and not to limit the disclosure. It is expected that others will perceive differences, which while differing from the foregoing, do not depart from the spirit and scope of the disclosure herein described and claimed.

What is claimed is:

1. A battery paste consisting of:
a battery paste mix consisting of lead oxide, flock, water and sulfuric acid; and
a tetra basic lead sulfate additive, wherein the tetra basic lead sulfate additive has a median particle size of approximately 1.0 micron or less;
wherein the lead oxide contains less than 10% free lead; and
wherein the lead oxide is calcined lead monoxide having 0.15% free lead.

2. The battery paste of claim 1, wherein the tetra basic lead sulfate is added to battery paste mix in the amount of 0.25%-5.0%.

3. The battery paste of claim 1, wherein the tetra basic lead sulfate promotes the formation of more tetra basic lead sulfate in the battery paste during paste mixing.

4. The battery paste of claim 1, wherein the oxide substantially eliminates free lead in the battery paste during paste mixing.

5. The battery paste of claim 3, wherein the battery paste contains 40%-75% tetra basic lead sulfate at the end of paste mixing.

6. The battery paste of claim 4, wherein the battery paste contains 0%-5% free lead at the end of paste mixing.

7. A battery paste consisting of:
a battery paste mix consisting of lead oxide, flock, water and sulfuric acid; and a tetra basic lead sulfate additive, wherein the tetra basic lead sulfate additive has a median particle size of approximately 1.0 micron or less;

wherein the lead oxide contains less than 10% free lead; and wherein the lead oxide is flash calcined lead monoxide having 0.15% free lead.

8. The battery paste of claim 1, wherein the amount of lead oxide in the paste is between 78.3%-81.2% weight.

9. The battery paste of claim 1, wherein the amount of the TTBLS additive in the paste is between 0.79%-0.80% weight.

10. The battery paste of claim 1, wherein the amount of water in the paste is between 8.94%-10.39% weight.

11. The battery paste of claim 1, wherein the amount of sulfuric acid in the paste is between 8.53%-9.86% weight.

12. The battery paste of claim 1, wherein the amount of flock in the paste is between 0.02%-0.04% weight.

13. The battery paste of claim 1, wherein the TTBLS additive is formed by reacting a mixture of water, lead oxide and sulfuric acid in the presence of a seed amount of tetra basic lead sulfate to create TTBLS crystals.

14. The battery paste of claim 7, wherein the amount of lead oxide in the paste is between 78.3%-81.2% weight.

15. The battery paste of claim 7, wherein the amount of the TTBLS additive in the paste is between 0.79%-0.80% weight.

16. The battery paste of claim 7, wherein the amount of water in the paste is between 8.94%-10.39% weight.

17. The battery paste of claim 7, wherein the amount of sulfuric acid in the paste is between 8.53%-9.86% weight.

18. The battery paste of claim 7, wherein the amount of flock in the paste is between 0.02%-0.04% weight.

19. The battery paste of claim 7, wherein the TTBLS additive is formed by reacting a mixture of water, lead oxide and sulfuric acid in the presence of a seed amount of tetra basic lead sulfate to create TTBLS crystals.

20. A battery paste consisting of:
a battery paste mix consisting of lead oxide, flock, water, sulfuric acid, and an expander; and
a tetra basic lead sulfate additive, wherein the tetra basic lead sulfate additive has a median particle size of approximately 1.0 micron or less;
wherein the lead oxide contains less than 10% free lead; and
wherein the lead oxide is calcined lead monoxide having 0.15% free lead.

21. The battery paste of claim 20, wherein the amount of expander in the paste is between 0.79%-1.59% weight.

22. A battery paste consisting of:
a battery paste mix consisting of lead oxide, flock, water, sulfuric acid, and an expander; and
a tetra basic lead sulfate additive, wherein the tetra basic lead sulfate additive has a median particle size of approximately 1.0 micron or less;
wherein the lead oxide contains less than 10% free lead; and
wherein the lead oxide is flash calcined lead monoxide having 0.15% free lead.

23. The battery paste of claim 22, wherein the amount of expander in the paste is between 0.79%-1.59% weight.

* * * * *